United States Patent [19]

McCarty et al.

[11] Patent Number: 4,961,303

[45] Date of Patent: Oct. 9, 1990

[54] APPARATUS FOR OPENING CONDITIONING ROLLS

[75] Inventors: Horace G. McCarty; Joseph C. Hurlburt, both of Lancaster, Pa.

[73] Assignee: Ford New Holland, Inc., New Holland, Pa.

[21] Appl. No.: 377,877

[22] Filed: Jul. 10, 1989

[51] Int. Cl.⁵ .............................................. A01D 82/00
[52] U.S. Cl. .......................... 56/14.100; 56/DIG. 1; 100/169.000
[58] Field of Search ...................... 56/14.1, 1, DIG. 1, 56/14.2, 14.3, 14.4; 100/168, 169, 171

[56] References Cited

U.S. PATENT DOCUMENTS

| | | | |
|---|---|---|---|
| 3,672,135 | 6/1972 | Peacock et al. | 56/14.2 |
| 4,174,600 | 11/1979 | Cicci et al. | 56/1 |
| 4,519,188 | 5/1985 | Webster et al. | 100/169 |

Primary Examiner—Ramon S. Britts
Assistant Examiner—Terry Lee Melius
Attorney, Agent, or Firm—Larry W. Miller; Frank A. Seemar; Darrell F. Marquette

[57] ABSTRACT

A mechanism for forcing apart the upper and lower rolls in a crop conditioning apparatus is disclosed wherein the torsion bar operably associated with the upper conditioning roll to assert a biasing force thereon to urge the upper roll toward engagement with the lower roll is anchored against one of the lift arms pivotally supporting the crop gathering header for generally vertical movement relative to the ground. The anchor is in the form of a connecting link pivotally interconnecting one of the lift arms and an anchoring arm forming a portion of a hub assembly engaged with the torsion bar to effect rotation thereof to create the biasing forces exerted on the upper roll. The movement of the lift arms to raise the crop gathering header relative to the ground causes a reverse rotation of the hub assembly and the engaged torsion bar to lessen the biasing force exerted thereby. A sufficient vertical movement of the lift arms will create reverse biasing forces to urge the upper roll away from the lower roll, effecting a corresponding movement of the upper roll.

9 Claims, 5 Drawing Sheets

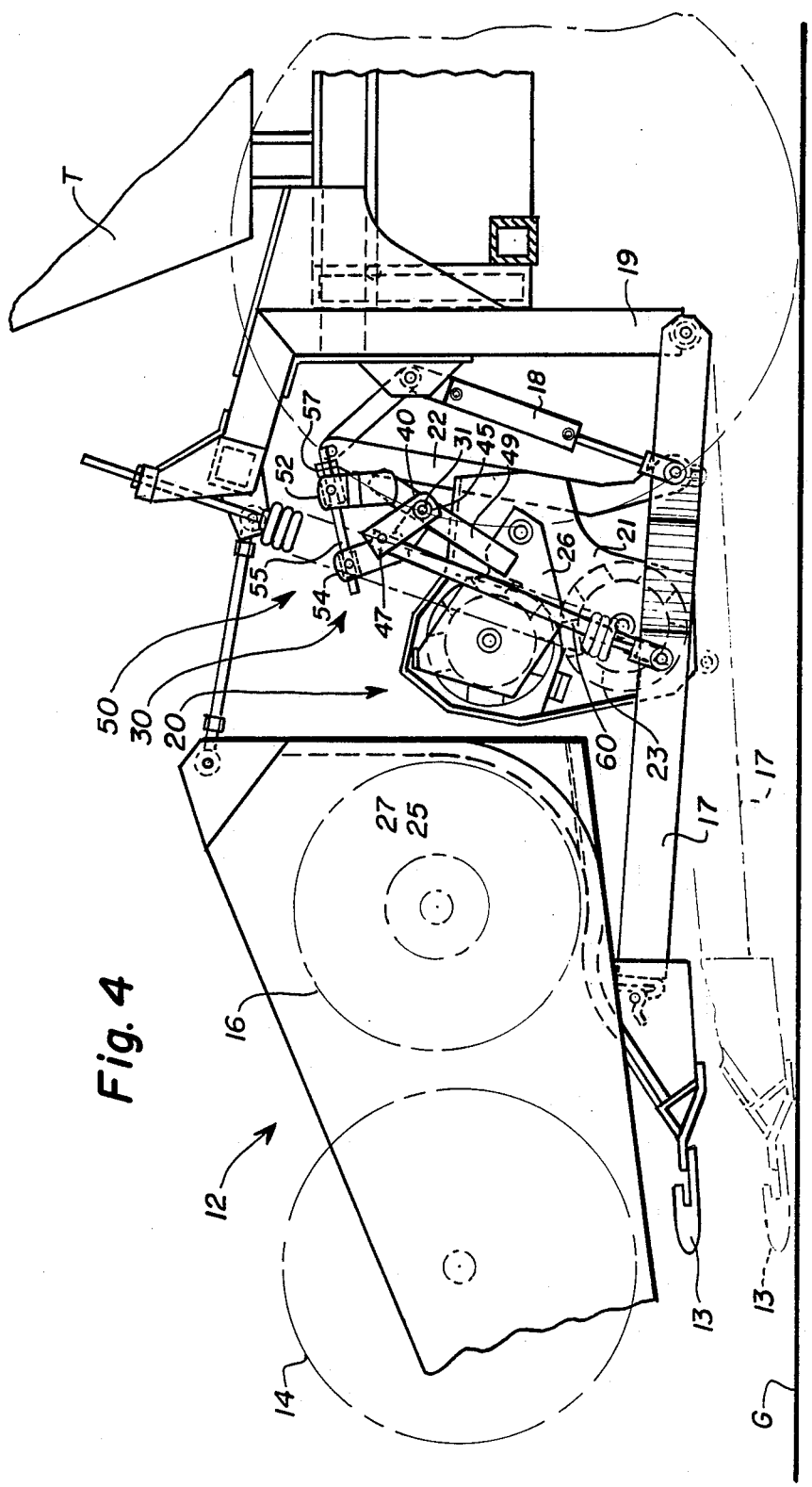

APPARATUS FOR OPENING CONDITIONING ROLLS

BACKGROUND OF THE INVENTION

The present invention relates generally to crop harvesting machines containing a conditioning mechanism to condition crop material fed thereto and, more particularly, to a mechanism for spreading the upper and lower conditioning rolls apart when the crop gathering header is raised relative to the ground.

Mower conditioners typically include a crop gathering header which is normally provided with a cutterbar operable to sever standing crop material from the field, a conveying device, such as a rotating reel and/or an auger to convey the severed crop material rearwardly over the cutterbar, and a conditioning mechanism mounted rearwardly of the cutterbar to receive severed crop material from the reel or auger and effect a conditioning of the severed crop material to hasten the drying thereof. Although flail-type conditioners have enjoyed some success, conditioning mechanisms in North America generally include a pair of vertically spaced, counterrotating conditioning rolls operable to receive severed crop material therebetween to effect a conditioning thereof.

Because of varying thicknesses of materials passing between the counterrotating conditioning rolls, the upper conditioning roll has traditionally been mounted on pivot arms to permit a generally vertical movement of the upper conditioning roll toward and away from the fixed lower conditioning roll. To assure maximum engagement with the crop material to be conditioned, the upper conditioning roll is usually engaged with a biasing mechanism to urge the upper conditioning roll toward engagement with the lower conditioning roll. As the upper roll moves away from the lower roll, the biasing force is normally increased.

Under some situations, the amount of crop material passing between the counterrotating conditioning rolls is so great as to cause a plugging of the conditioning mechanism, which requires excessive torque to effect continued rotation of the conditioning rolls. In such situations, it is necessary to remove the crop material jammed between the conditioning rolls. To facilitate the removal of this material from between the conditioning rolls, it would be helpful to be able to raise the upper conditioning roll relative to the lower conditioning roll such as is generally taught in U.S. Pat. No. 4,174,600. However, it would be desirable to provide a device for manipulating the biasing forces exerted by the torsion bar on the upper conditioning roll to create reverse biasing forces urging the upper conditioning roll away from the lower conditioning roll without providing additional structure specifically for forcing the upper roll away from the lower roll by overcoming the biasing forces.

SUMMARY OF THE INVENTION

It is an object of this invention to overcome the aforementioned disadvantages of the prior art by providing a conditioning roll opening mechanism operable to manipulate the biasing forces exerted by the torsion bar on the upper conditioning roll to create a reverse biasing force urging the upper roll away from the lower roll.

It is another object of this invention to provide an anchor for the mounting mechanism engaged with the torsion bar which is movable with the lift arms supporting the crop gathering header.

It is a feature of this invention that a moving of the lift arms to raise the crop gathering header relative to the ground causes a rotation of the mounting mechanism and the engaged torsion bar to create a reverse biasing force urging the upper conditioning roll away from the lower conditioning roll.

It is still another object of this invention to effect a separation of the conditioning rolls by manipulating the biasing forces exerted on the upper conditioning roll rather than by overwhelming the biasing forces.

It is an advantage of this invention that the upper conditioning roll can be moved away from the lower conditioning roll without providing structure operable to overwhelm the biasing forces exerted on the upper conditioning roll.

It is another feature of this invention that the mounting mechanism includes a hub assembly having an anchoring arm interconnected with a header lift arm by a connecting link pivotally extending therebetween.

It is another advantage of this invention that a raising of the crop gathering header effects a reduction in the biasing forces exerted on the upper conditioning roll.

It is still another advantage of this invention that the conditioning mechanism can be easily unplugged by a raising of the crop gathering header.

It is yet another object of this invention to provide an apparatus for spreading apart conditioning rolls for utilization on a mower conditioner which is durable in construction, inexpensive of manufacture, carefree of maintenance, facile in assemblage, and simple and effective in use.

These and other objects, features, and advantages are accomplished according to the instant invention by providing a mechanism for forcing apart the upper and lower rolls in a crop conditioning apparatus wherein the torsion bar operably associated with the upper conditioning roll to assert a biasing force thereon to urge the upper roll toward engagement with the lower roll is anchored against one of the lift arms pivotally supporting the crop gathering header for generally vertical movement relative to the ground. The anchor is in the form of a connecting link pivotally interconnecting one of the lift arms and an anchoring arm forming a portion of a hub assembly engaged with the torsion bar to effect rotation thereof to create the biasing forces exerted on the upper roll. The movement of the lift arms to raise the crop gathering header relative to the ground causes a reverse rotation of the hub assembly and the engaged torsion bar to lessen the biasing force exerted thereby. A sufficient vertical movement of the lift arms will create reverse biasing forces to urge the upper roll away from the lower roll, effecting a corresponding movement of the upper roll.

BRIEF DESCRIPTION OF THE DRAWINGS

The advantages of this invention will become apparent upon consideration of the following detailed disclosure of the invention, especially when taken in conjunction with the accompanying drawings wherein:

FIG. 4 is an enlarged side elevational view similar to that of FIG. 3 with the crop gathering header being lifted above the ground, the lowered harvesting position of the lift arms and cutterbar being shown in phantom;

DETAILED DESCRIPTION OF THE PREFERRED EMBODIMENT

Figure 1:
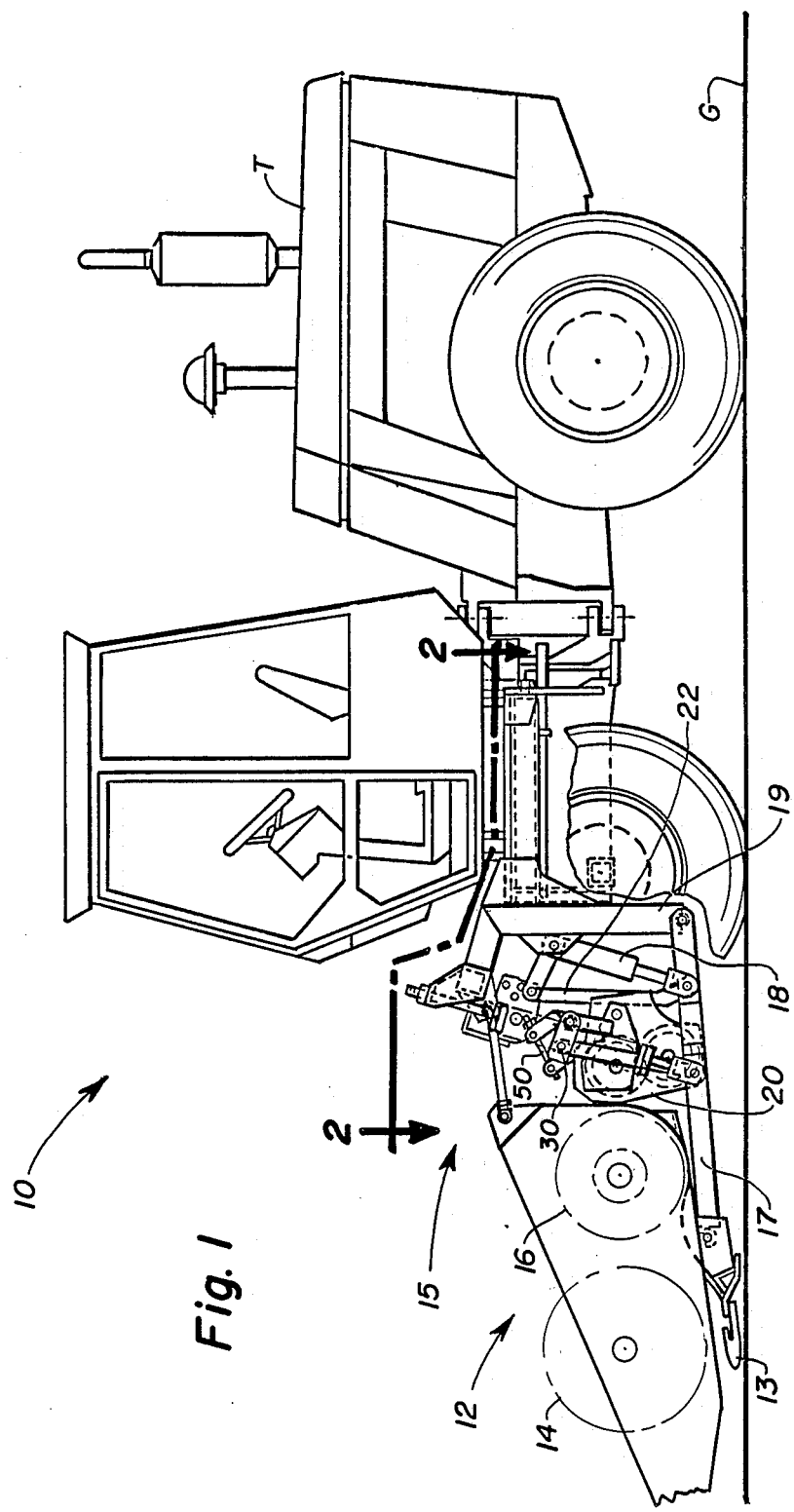
FIG. 1 is a side elevational view of a crop harvesting machine mounted on a tractor, the crop harvesting machine including a crop gathering header and a rearwardly positioned conditioning mechanism incorporating the principles of the instant invention, portions of the tractor and crop gathering header being broken away for purposes of clarity.

Referring now to the drawings and, particularly, to FIGS. 1-4, side elevational and top plan views of a crop harvesting machine attached to a prime mover, such as a tractor, incorporating the principles of the instant invention, can best be seen. Any left and right references are used as a matter of convenience and are determined by standing at the rear of the tractor, facing the forward end, the direction of travel. Although the drawings depict the employment of this invention on a tractor mounted crop harvesting machine, commonly referred to as a mower conditioner or windrower, one skilled in the art will readily realize that the principles of the instant invention will be equally applicable to any pull-type or self-propelled crop harvesting machine utilizing a biasing force to urge a movable member toward engagement with a fixed member. The details of the construction of the conditioning mechanism, including the biasing mechanism, is described in greater detail in co-pending patent application Ser. No. 377,876, entitled "Conditioning Roll Biasing Mechanism" filed simultaneously herewith, the descriptive portions of this co-pending patent application being incorporated herein by reference.

The crop harvesting machine 10 is of the type to be mounted on the forward end of a tractor T to be pushed into the crop material to be harvested. The crop harvesting machine 10 includes a crop gathering header 12 which includes a conventional reciprocating cutterbar 13 to sever standing crop material from the ground G, a rotating reel 14 to convey the severed crop material over the cutterbar 13 and rearwardly therefrom in a conventional manner, and an auger 16 transversely extending along the rear of the crop gathering header 12 to receive severed crop material from the reel 14, converge the crop material and discharge it toward the rearwardly positioned conditioning mechanism 20. The crop gathering header 12 is mounted on forwardly extending lift arms 17 that are pivotally connected to the frame 19 of the crop harvesting machine 10 and pivotally movable by hydraulic lift cylinders 18 to effect a raising and lowering of the crop gathering header 12 relative to the ground G.

Figure 2:
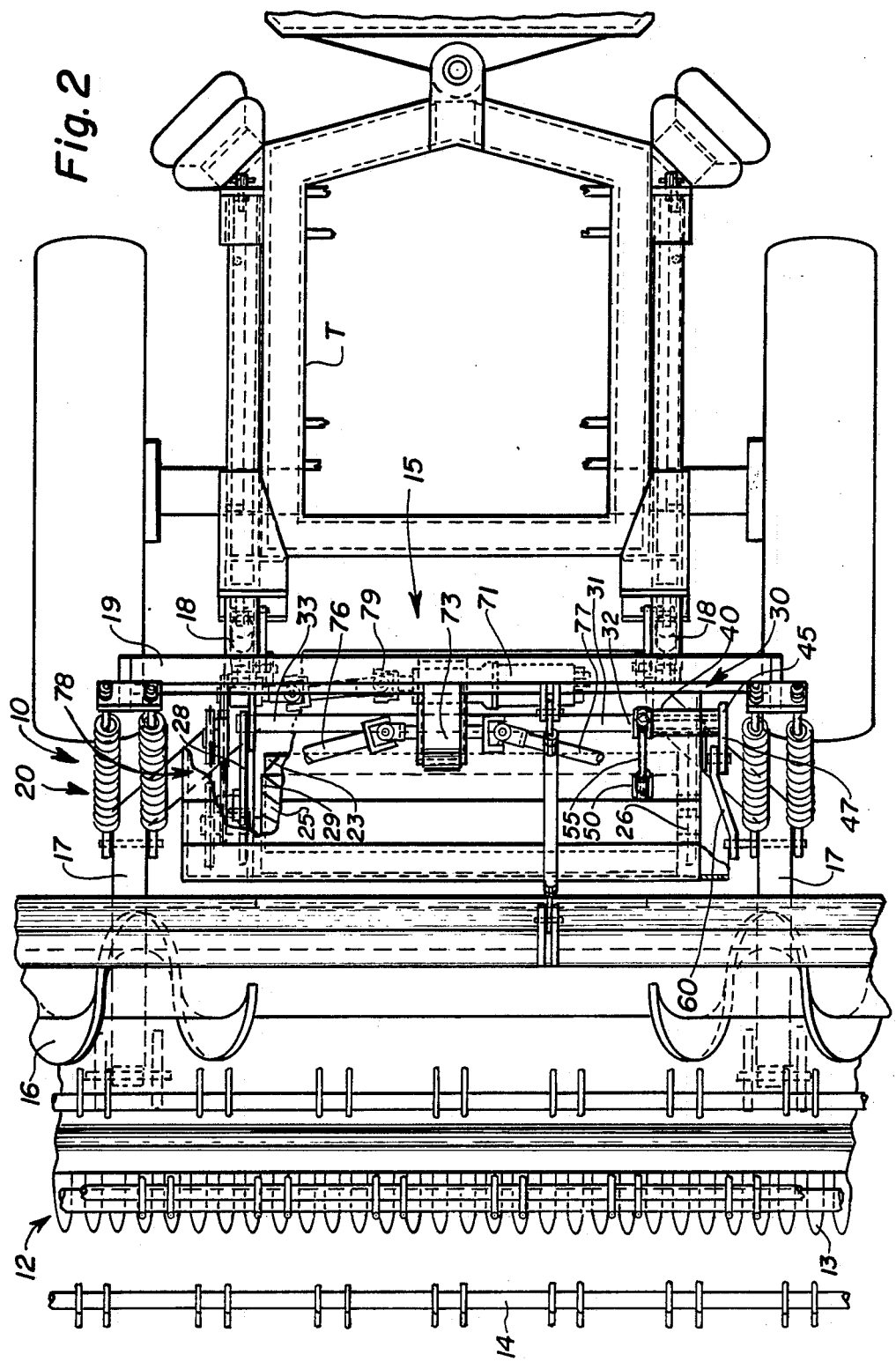
FIG. 2 is a cross-sectional view of the crop harvesting machine taken along lines 2—2 of FIG. 1 to show a top plan view of the crop gathering header and conditioner, a major portion of both the tractor and the crop gathering header being broken away to facilitate a viewing of the conditioning mechanism incorporating the principles of the instant invention.
Figure 3:
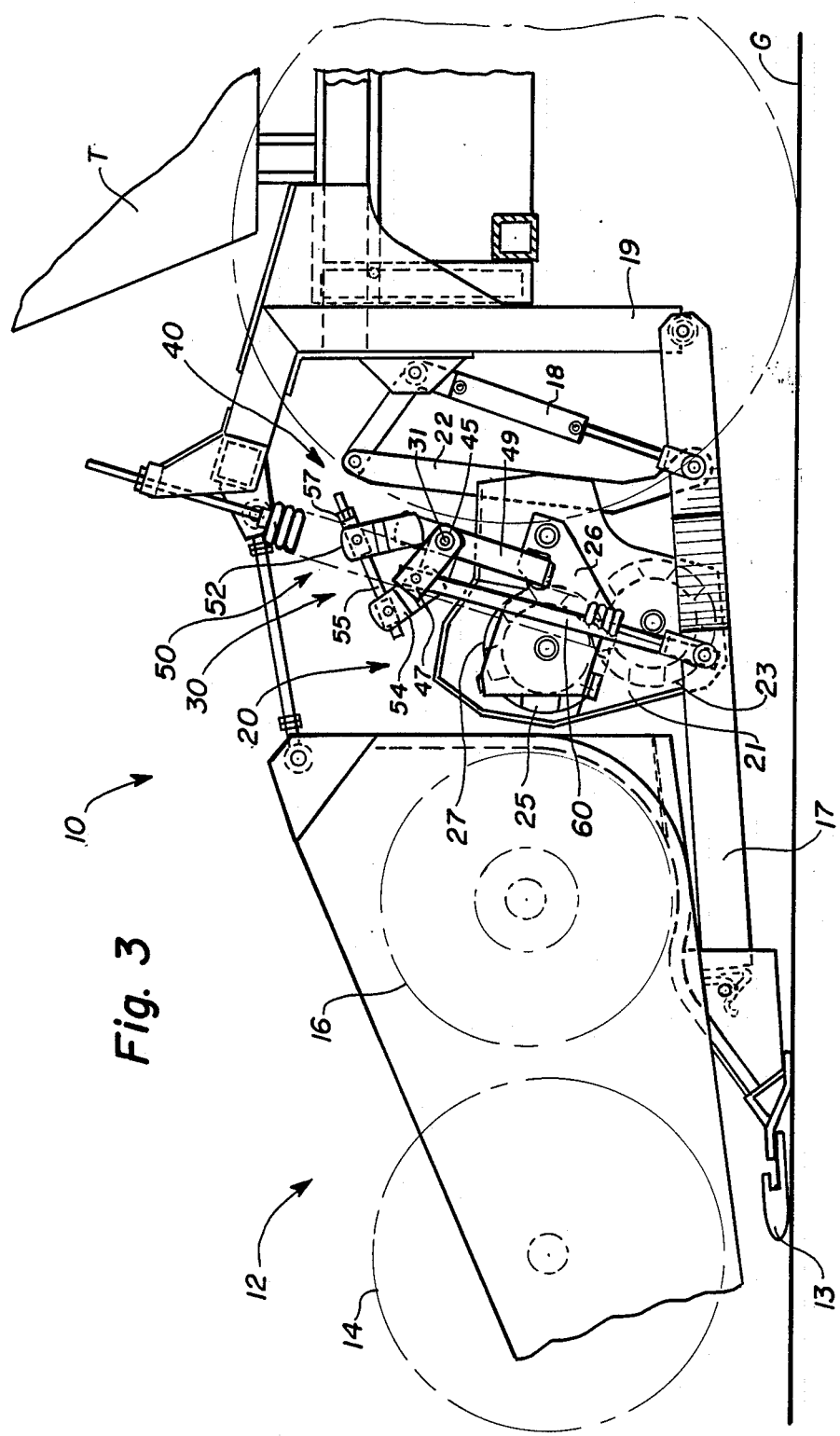
FIG. 3 is an enlarged side elevational view of the conditioning mechanism shown in FIG. 1 with the crop gathering header schematically shown mounted on forwardly extending lift arms, portions of the conventional header flotation springs being broken away to permit a viewing of the instant invention, the header being shown in a lowered harvesting position.

The crop harvesting machine 10 has a drive mechanism 15 best seen in FIG. 2 to power the operation of both the crop gathering header 12 and the conditioning mechanism 20. The drive mechanism 15 includes a hydraulically powered motor 71 that provides rotational power to a gear box 73 which in turn delivers rotational power to opposing ends of the crop gathering header 12 through drive shaft 76, 77 and to a chain drive mechanism 78 for the conditioning mechanism 20 through the drive shaft 79.

The conditioning mechanism 20 is positioned immediately rearwardly of the crop gathering header 12 and is supported from the frame 19 of the crop harvesting machine 10 by a subframe 21 affixed to articulated support links 22 interconnecting the frame 19 and the lift arms 17 to form a four-bar support linkage for the conditioning mechanism permitting relative movement between the conditioning mechanism 20 and the lift arms 17. The conditioning mechanism 20 is provided with a lower conditioning roll 23 rotatably mounted in a fixed orientation in the subframe 21. The conditioning mechanism 20 also includes an upper conditioning roll 25 rotatably journaled in transversely spaced left and right pivot arms 26, 28, respectively, pivotally connected to the subframe 21 in mounting the left and right ends, 27, 29, respectively, of the upper conditioning roll 25 for generally vertical movement toward and away from the lower conditioning roll 23.

The conditioning mechanism 20 is also provided with a biasing mechanism 30 which is operably associated with the upper conditioning roll 25 to exert a biasing force thereon to urge the upper conditioning roll 25 toward engagement with the lower conditioning roll 23 to exert a proper conditioning on the severed crop material passing between the upper and lower conditioning rolls 25, 23. The biasing mechanism 30 includes a transversely oriented torsion bar 31 having left and right ends 32, 33 generally adjacent to and spaced above the left and right ends 27, 29 of the upper conditioning roll 25. Rotational power is delivered to both the upper and lower conditioning rolls 25, 23 by means of the chain drive apparatus 78 rotatably driven by the conditioning mechanism drive shaft 79.

The torsion bar 31 is engaged at the left end 32 with a mounting mechanism 40 to control the twisting movement of the torsion bar 31 in response to the pivotal movement of the left pivot arm 26 rotatably supporting the left end 27 of the upper conditioning roll 25. The mounting mechanism 40 includes a hub assembly 45 having an anchoring arm 47 extending perpendicularly outwardly therefrom. The mounting mechanism 40 also includes an adjustment apparatus 50 having a first adjustment member 52 connected to the torsion bar 31 and a second adjustment member 54 affixed to the hub assembly 45 to be movable therewith. A draw bolt 55 is engaged with both the first and second adjustment members 52, 54 such that a nut 57 threadably engaged with the draw bolt 55 is operable to draw the two adjustment members 52, 54 toward each other and, thereby, effect a twisting of the left end 32 of the torsion bar 31 relative to the hub assembly 45. One skilled in the art will readily realize that other embodiments of the draw bolt 55 would be equally applicable, such as a headed bolt 55 threaded into the adjustment member 52, 54 remote from the bolt head, so long as the draw bolt is effective to cause relative movement between the adjustment members 52, 54.

The hub assembly 45 is anchored by a connecting link 60 pivotally interconnecting the anchoring arm 47 and the corresponding lift arm 17 proximate thereto for stabilizing the rotation of the hub assembly 45 during the operation of the adjustment apparatus 50 to vary the minimum biasing force exertable on the upper conditioning roll 25. The anchoring of the hub assembly 45 to the lift arm 17 also permits appropriate operation of the torsion bar 31 to increase the biasing force exerted on the upper conditioning roll 25 when the upper roll is pivoted away from the lower roll 23 by material passing therebetween.

A movement of the right pivot arm 28 to effect a twisting of a torsion bar 31 results in additional biasing forces being exerted on the left end 27 of the upper roll 25. Due to the connection of the anchoring arm 47 to the connecting link 60, which in turn is pivoted on the lift arm 17, the hub assembly 45 will attempt to rotate about the pivotal connection between the anchoring arm 47 and the connecting link 60. As a result, the hub assembly 45 will press downwardly on the left pivot arm 26 and urge the upper conditioning roll 25 toward engagement with the lower conditioning roll 23.

A corresponding upward movement of the left pivot arm 26 will effect a lifting of the hub assembly 45 due to the direct connection thereof with the support member 49; however, since the hub assembly 45 is anchored to the lift arm 17 which remains stationary, the upward movement of the left pivot arm 26 will result in a counterclockwise rotation of the hub assembly 45 as it is being lifted with the left pivot arm 26. This counterclockwise rotation of the hub assembly 45, as viewed from the left side of the conditioning mechanism 20, effects a corresponding clockwise rotation of the torsion bar 31 when viewed from the right side of the conditioning mechanism 20 to effect the application of additional biasing forces on the right end 29 of the upper conditioning roll 25.

Figure 7:
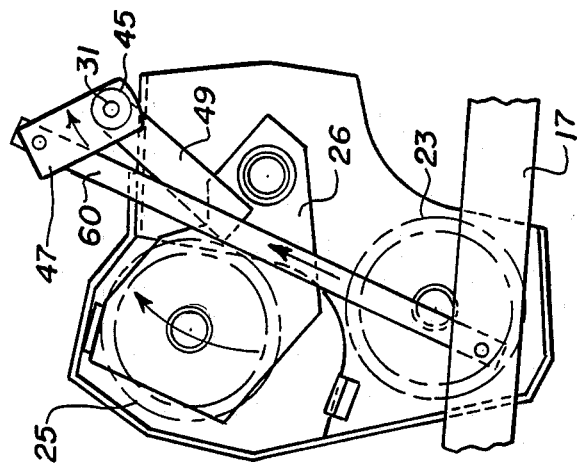
FIG. 7 is a schematic side elevational view of the conditioning mechanism similar to that of FIGS. 5 and 6 showing the movement of the lift arms to raise the crop gathering header into an elevated position sufficiently to create a reverse biasing force spreading the upper conditioning roll away from the lower conditioning roll.
Figure 6:
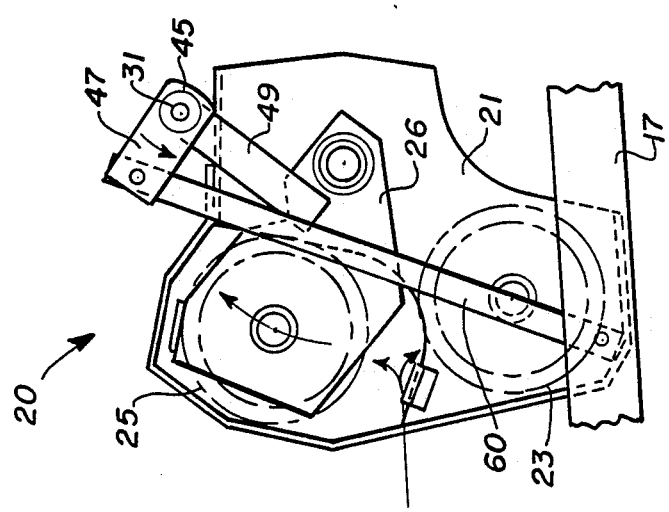
FIG. 6 is a schematic side elevational view of the conditioning mechanism similar to that of FIG. 5 showing the upper roll being moved upwardly due to a greater thickness of material passing between the upper and lower conditioning rolls to activate an increase in biasing forces exerted by the biasing mechanism.
Figure 5:
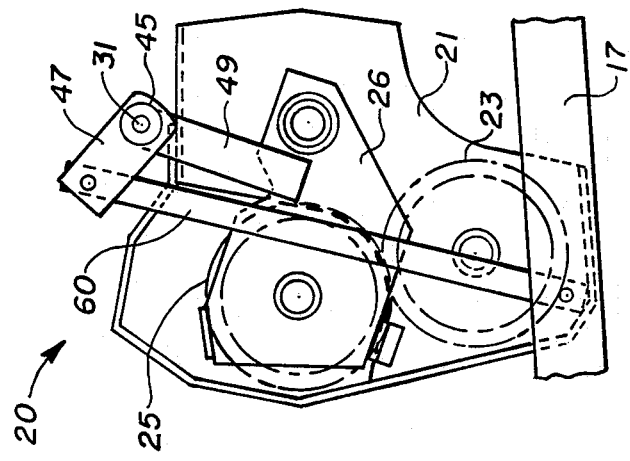
FIG. 5 is a schematic side elevational view of the conditioning mechanism with the crop harvesting header in a lowered harvesting position.

Referring now to FIGS. 5-7, the operation of the mounting mechanism 40 can best be seen. As shown in FIG. 5, the normal operation of the conditioning mechanism 20 provides the minimum biasing force exerted by the biasing mechanism 30 on the upper conditioning roll 25 when the upper roll 25 is proximate to the lower conditioning roll 23. In FIG. 6, the movement of the upper conditioning roll 25 corresponding to a slug of material passing between the conditioning rolls 25, 23, forcing the rolls 23, 25 apart, is depicted. The movement of the left pivot arm 26 causes an upward and rearward movement of the hub assembly 45 with the left pivot arm 26 due to the journaling of the hub assembly 45 on the support member 49 connected directly to the left pivot arm 26. Because the anchoring arm 47 is anchored to the stationary lift arm 17, which remains with the header 12 in a lowered harvesting position, by the connecting link 60, the hub assembly 45 is rotated relative to the support member 49 causing a corresponding twisting of the torsion bar 31 to effect an increase of the biasing forces exerted on the upper roll 25 to urge the upper roll 25 back toward engagement with the lower roll 23.

Referring now to FIG. 7, the movement of the upper conditioning roll 25 as caused by the movement of the lift arm 17 to raise the crop gathering header 12 into an elevated position, such as for transporting, is represented. Because of the fixation of the anchoring arm 47 to the lift arm 17 by the connecting link 60, the hub assembly 45 is rotated in a clockwise direction viewed from the left side of the conditioning mechanism 20, causing a corresponding rotation of the torsion bar 31. Similar to that described above, this clockwise rotation of the torsion bar 31, as viewed from the left side of the conditioning mechanism 20, reduces the biasing forces exerted by the torsion bar 31 on both ends 27, 29 of the upper conditioning roll 25. In fact, a sufficient raising of the lift arm 17 will create a reverse biasing force by countertwisting the torsion bar 31 to urge both ends 27, 29 of the upper conditioning roll 25 away from the lower conditioning roll 23, thereby opening the conditioning rolls 23, 25, as represented in FIG. 7.

Accordingly, it can be seen that anchoring the hub assembly 45 to the lift arm 17 can create reverse biasing forces on the upper conditioning roll 25 to effect a spreading of the conditioning rolls 23, 25 to facilitate removal of material therebetween merely upon a raising of the crop gathering header 12. This spreading of the conditioning rolls 23, 25 is accomplished by manipulating the biasing forces, rather than by providing structure substantial enough to overcome the biasing forces exerted by the biasing mechanism 30 on the upper conditioning roll 25.

It will be understood by one skilled in the art that the ability to actually spread the conditioning rolls 23, 25 upon a raising of the lift arm 17 will depend on the amount of minimum biasing force exerted by the torsion bar 31, set through the manipulation of the adjustment apparatus 50. If a large amount of minimum biasing force has been set, the geometry of the connection between the lift arm 17 and the hub assembly 45 may not permit a complete reduction of the biasing forces exerted by the torsion bar 31 and a subsequent creation of reverse biasing forces. Nevertheless, the instant invention will result in a reduction of the biasing forces exerted by the torsion bar 31 to facilitate removal of crop material from between the conditioning rolls 23, 25. Furthermore, it will be understood that the flotational movements of the header 12 permitted by the conventional flotation springs interconnecting the frame 19 and the lift arms 17 will not cause significant changes to the biasing forces exerted by the torsion bar 31 because of the lack of substantial movement transferred to the hub assembly 45.

It will be understood that changes in the details, materials, steps, and arrangement of parts which have been described and illustrated to explain the nature of the invention will occur to and may be made by those skilled in the art upon a reading of this disclosure within the principles and scope of the invention. The foregoing description illustrates the preferred embodiment of the invention; however, concepts as based upon the description may be employed in other embodiments without departing from the scope of the invention. Accordingly, the following claims are intended to protect the invention broadly, as well as in the specific form shown.

Having thus described the invention, what is claimed is:

1. In a conditioning mechanism for a crop harvesting machine having a crop gathering header operable to gather crop material from a field and convey the gathered crop material to said conditioning mechanism, said crop gathering header being mounted on lift arms pivotally movable to raise said crop gathering header relative to the field, said conditioning mechanism including a frame; a pair of generally vertically spaced, counterrotating conditioning rolls mounted in said frame, the upper conditioning roll being movably mounted on said frame for generally vertical movement relative to the lower conditioning roll; and a biasing mechanism operably associated with said upper conditioning roll to urge movement thereof toward said lower conditioning roll, said biasing mechanism including resilient means operably supported on said frame to provide a biasing force for said biasing mechanism, said resilient means having an anchor against which said resilient means develops said biasing force, the improvement comprising:

said anchor including a connecting link pivotally connected to a member movable relative to said conditioning mechanism when said header is raised relative to the field such that a movement of said member when said crop harvesting header is raised effects a relaxing of the biasing forces exerted by said resilient means.

2. The conditioning mechanism of claim 1 wherein said resilient means is engaged with a mounted mechanism positioned adjacent one side of said crop harvesting header.

3. The conditioning mechanism of claim 2 wherein said mounting mechanism includes a hub assembly engaged with said resilient means and having an anchoring arm extending outwardly therefrom, said connecting link pivotally interconnecting said movable member and said anchoring arm.

4. The conditioning mechanism of claim 3 wherein said movable member is one of said lift arms and said resilient means is a torsion bar.

5. The conditioning mechanism of claim 4 wherein the movement of said lift arms to raise said crop harvesting header effects a rotation of said hub assembly to cause a rotation of said torsion bar to relax the biasing force exerted on said upper conditioning roll.

6. The conditioning mechanism of claim 5 wherein said torsion bar is rotated by the movement of said lift arms sufficiently to create a biasing force urging the movement of said upper conditioning roll away from said lower conditioning roll.

7. A conditioning mechanism for use in a crop harvesting machine having a crop gathering header operable to gather crop material from a field and convey said crop material to the conditioning mechanism for conditioning thereof, said crop gathering header being mounted on lift arms movably supported on said crop harvesting machine to effect a raising of said crop gathering header relative to the field, comprising:

a frame;

a lower roll rotatably mounted in a fixed orientation relative to said frame;

an upper roll rotatably mounted on pivot arms pivotally supported from said frame to permit movement of said upper roll toward and away from said lower roll;

a torsion bar operably connected to said upper roll such that a twisting of said torsion bar is operable to exert a biasing force urging the movement of said upper roll toward said lower roll; and a mounting mechanism engaged with said torsion bar to form an anchoring support against which said torsion bar twists to create said biasing force, said mounting mechanism including an anchor pivotally interconnecting said mounting mechanism and one of said lift arms so that an upward movement of said lift arms to raise said crop gathering header effects a rotation of said torsion bar to reduce said biasing force.

8. The conditioning mechanism of claim 7 wherein the upward movement of said lift arms and the corresponding rotation of said torsion bar is sufficient to create a reverse biasing force urging the movement of said upper roll away from said lower roll.

9. The conditioning mechanism of claim 8 wherein said mounting mechanism includes a hub assembly engaged with said torsion bar for rotation therewith, said hub assembly having an anchoring arm, said anchoring arm including a connecting link pivotally interconnecting said anchoring arm and said one lift arm.

* * * * *